(12) United States Patent
Aoyama et al.

(10) Patent No.: US 9,153,384 B2
(45) Date of Patent: Oct. 6, 2015

(54) METHOD OF MANUFACTURING AN ELECTROLYTIC CAPACITOR

(71) Applicant: Panasonic Corporation, Osaka (JP)

(72) Inventors: Tatsuji Aoyama, Kyoto (JP); Hiroyuki Matsuura, Shiga (JP); Yuuki Murata, Yamaguchi (JP); Yukiya Shimoyama, Yamaguchi (JP); Junya Kushizaki, Yamaguchi (JP); Hidehiro Sasaki, Toyama (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 19 days.

(21) Appl. No.: 14/278,356

(22) Filed: May 15, 2014

(65) Prior Publication Data

US 2014/0237785 A1    Aug. 28, 2014

Related U.S. Application Data

(62) Division of application No. 13/549,640, filed on Jul. 16, 2012, now Pat. No. 8,767,377.

(30) Foreign Application Priority Data

Jul. 25, 2011    (JP) .................................. 2011-161674

(51) Int. Cl.
| | |
|---|---|
| *H01G 9/00* | (2006.01) |
| *H01G 9/02* | (2006.01) |
| *H01G 9/025* | (2006.01) |
| *H01G 9/042* | (2006.01) |
| *H01G 11/28* | (2013.01) |
| *H01G 11/52* | (2013.01) |

(Continued)

(52) U.S. Cl.
CPC ............... *H01G 9/0029* (2013.01); *H01G 9/02* (2013.01); *H01G 9/025* (2013.01); *H01G 9/042* (2013.01); *H01G 11/28* (2013.01); *H01G 11/52* (2013.01); *H01G 11/56* (2013.01); *H01G 13/02* (2013.01); *H01G 2009/0025* (2013.01); *Y02E 60/13* (2013.01); *Y10T 29/417* (2015.01)

(58) Field of Classification Search
None
See application file for complete search history.

(56) References Cited

U.S. PATENT DOCUMENTS

| | | | |
|---|---|---|---|
| 7,872,858 B2 | 1/2011 | Kakuma et al. | |
| 8,405,957 B2 | 3/2013 | Katayama et al. | ............ 361/512 |

(Continued)

FOREIGN PATENT DOCUMENTS

| | | |
|---|---|---|
| JP | 6-196369 | 7/1994 |
| JP | 2008-066502 | 3/2008 |

(Continued)

*Primary Examiner* — Dion R Ferguson
(74) *Attorney, Agent, or Firm* — Panasonic Patent Center (57) ABSTRACT

An electrolytic capacitor includes a capacitor element and an electrolyte solution impregnated in the capacitor element. The capacitor element includes an anode foil, cathode foil, separator, and a solid electrolytic layer. The anode foil has a dielectric layer on its surface, and the cathode foil confronts the anode foil. The separator is interposed between the anode foil and the cathode foil. The solid electrolytic layer is formed on the surfaces of the anode foil, cathode foil, and separator as an aggregate of fine particles of conductive polymer. The separator has an air-tightness not greater than 2.0 s/100 ml. Sizes of the fine particles measure not greater than 100 nm in diameter, and an amount of the fine particles contained falls within a range from 0.3 mg/cm² to 1.2 mg/cm², inclusive, as converted to weight per unit area of the anode foil.

10 Claims, 6 Drawing Sheets

(51) Int. Cl.
*H01G 11/56* (2013.01)
*H01G 13/02* (2006.01)

(56) References Cited

U.S. PATENT DOCUMENTS

8,637,177 B2   1/2014   Nomura et al.   ............ 429/144

2009/0122466 A1   5/2009   Blankenbeckler   ............ 361/502
2009/0144954 A1   6/2009   Furusawa et al.
2010/0151333 A1   6/2010   Nakamori et al.   ............ 429/249

FOREIGN PATENT DOCUMENTS

| JP | 2008-124064 | 5/2008 |
| JP | 2009-016770 | 1/2009 |
| JP | 2010-087014 | 4/2010 |
| JP | 2010-272560 | 12/2010 |

METHOD OF MANUFACTURING AN ELECTROLYTIC CAPACITOR

BACKGROUND

1. Field

The present invention relates to electrolytic capacitors to be used in a variety of electronic devices, electric devices, industrial devices, and automotive devices. It also relates to a method of manufacturing the same capacitors.

2. Background Art

The electronic devices have adopted digital technology, so that the capacitors employed in output side circuits, e.g. a smoothing circuit or a control circuit, of the power supplies of those devices need to be smaller in size and greater in capacity. Moreover, the capacitor is desired to have a smaller equivalent series resistance (hereinafter simply referred to as ESR) in a high frequency band. A liquid impregnated capacitor that employs liquid electrolyte such as electrolyte solution has been typically used in the output side circuit of the power supply. However, in recent years, solid electrolytic capacitors have been used for the same purpose, and they employ solid electrolyte such as transition metal oxides such as manganese dioxide, organic semiconductor, e.g. TCNQ complex salt, or conductive polymer such as polypyrrole, polythiophene, and polyaniline. As discussed above, there is a trend toward smaller ESR in the electrolytic capacitors.

The solid electrolytic capacitor is excellent particularly in the smaller ESR than the liquid electrolytic capacitor; however, its recovery action is poor at a failure of anodic oxide film working as dielectric. The solid electrolytic capacitor thus tends to invite an increment in leakage current, and in the worst case, it results in a short.

On the other hand, audio-video devices and automotive electronics need increasingly a higher reliability, so that the solid electrolytic capacitor should improve the performance of small leakage current and also the anti-short properties in addition to the advantages of small in size, great in capacity, and low ESR. To meet those needs, a hybrid electrolytic capacitor has been proposed, namely, electrolyte solution is used together with solid electrolytic material such as conductive polymer, because the electrolyte solution is excellent in recovery action at a failure of the anodic oxide film working as dielectric.

Figure 4:
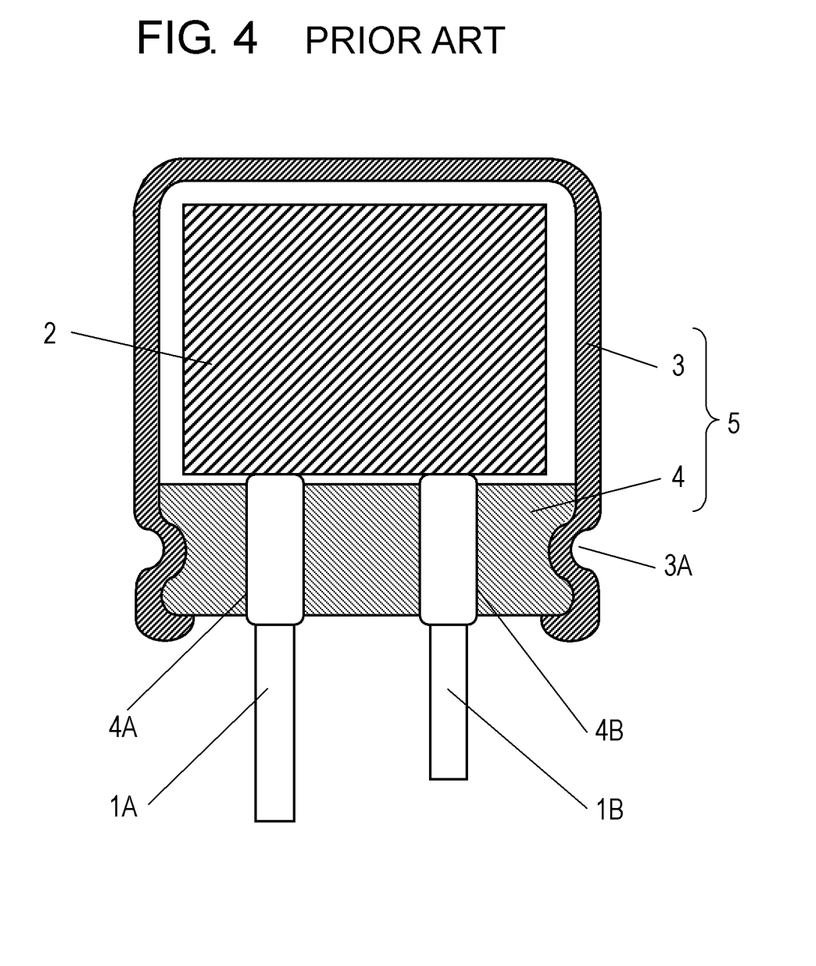
FIG. 4 is a sectional view illustrating a structure of a conventional hybrid electrolytic capacitor including a wound-type capacitor element.
Figure 5:
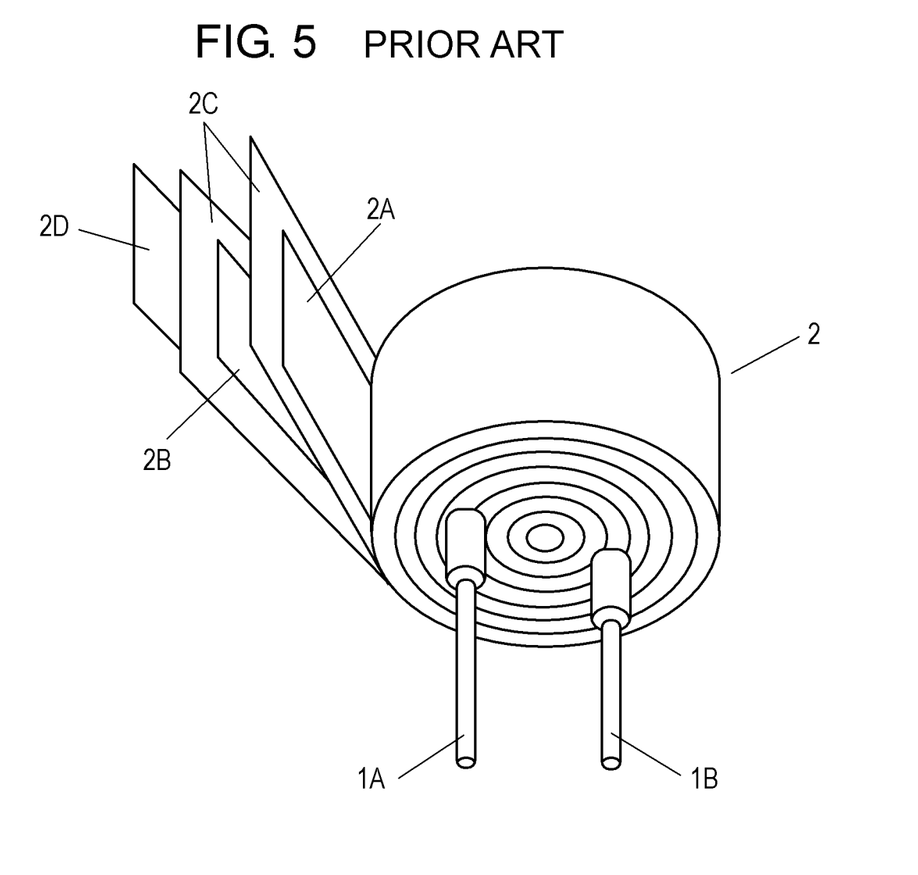
FIG. 5 is an exploded perspective view of the capacitor element shown in FIG. 4.
Figure 6:
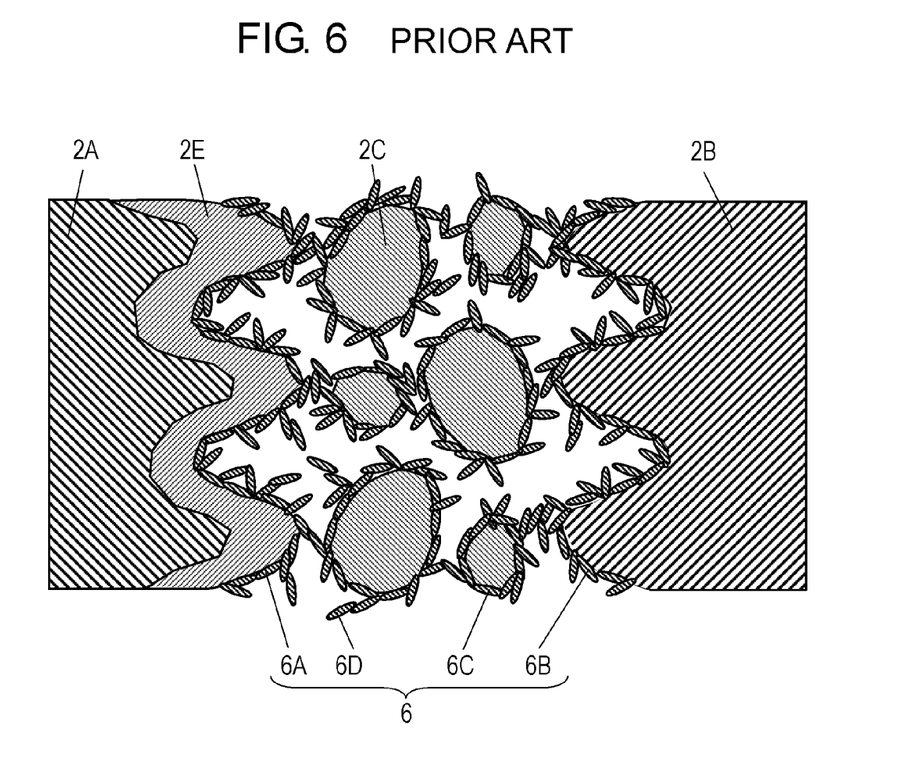
FIG. 6 is a sectional view enlarging schematically an essential part of the capacitor element shown in FIG. 4.

FIG. 4 is a sectional view illustrating a structure of a conventional hybrid electrolytic capacitor (wound type), and FIG. 5 is an exploded perspective view of a capacitor element of this hybrid electrolytic capacitor. FIG. 6 is a sectional view illustrating schematically an essential part enlarged.

As shown in FIG. 4, this hybrid electrolytic capacitor has capacitor element 2 as a functional element, a pair of lead wires 1A, 1B, and outer package 5. First ends of lead wires 1A, 1B are connected to capacitor element 2, and second ends thereof are led outside. Outer package 5 encloses capacitor element 2 and electrolyte solution (not shown) together therein.

As shown in FIGS. 5 and 6, capacitor element 2 includes anode foil 2A, cathode foil 2B, and separator 2C. Anode foil 2A is made of foil of valve metal, e.g. aluminum, having undergone an etching process to roughen the surface, on which dielectric layer 2E of the anodic oxide film is formed by a chemical conversion process. Cathode foil 2B is made of valve metal such as aluminum. Anode foil 2A and cathode foil 2B are layered and wound together with separator 2C disposed therebetween.

On top of that, conductive polymer layer 6 formed of particles or aggregate of the conductive polymer such as polyethylene dioxythiophene is disposed between anode foil 2A and cathode foil 2B. Conductive polymer layer 6 is provided on the surfaces of anode foil 2A, cathode foil 2B, and separator 2C. First ends of lead wires 1A, 1B are connected to anode foil 2A and cathode foil 2B respectively, and second ends thereof are led out from a same end face of capacitor element 2.

Outer package 5 is formed of cylindrical housing 3 having a bottom, and sealing body 4. Housing 3 accommodates capacitor element 2 impregnated with electrolyte solution. Sealing body 4 is provided with through holes 4A, 4B for lead wires 1A, 1B to run through respectively. Sealing body 4 is disposed at an opening of housing 3, and a drawing process is provided to an outer wall of housing 3 to compress and deform sealing body 4, thereby sealing the opening with the aid of sealing body 4 formed of rubber packing.

SUMMARY

An electrolytic capacitor of the present invention has a capacitor element, electrolyte solution impregnated into the capacitor element, and an outer package enclosing the capacitor element together with the electrolyte solution. The capacitor element includes an anode foil, a cathode foil, a separator, and a solid electrolytic layer. The anode foil has a dielectric layer on its surface. The cathode foil confronts the anode foil, and the separator is disposed between the anode foil and the cathode foil. The solid electrolytic layer is formed of an aggregate of fine particles of conductive polymer, on the surfaces of the anode foil, cathode foil, and the separator. An air-tightness of the separator falls within the range from 0.5 s/100 ml to 2.0 s/100 ml, inclusive. Sizes of the fine particles of the conductive polymer fall within the range from 25 nm to 100 nm, inclusive. Each of the foregoing surfaces contains the fine particles of the conductive polymer at a rate falling within the range from 0.3 mg/cm$^2$ to 1.2 mg/cm$^2$, inclusive as converted to weight per unit area of the anode foil.

DETAILED DESCRIPTION OF PREFERRED EMBODIMENT

Prior to the description of the exemplary embodiment of the present invention, a method of manufacturing a conventional hybrid electrolytic capacitor shown in FIG. 4 is described hereinafter.

First, as shown in FIG. 5, anode foil 2A, cathode foil 2B, and separator 2C are prepared. Anode foil 2A is formed of valve metal, e.g. aluminum, and has dielectric layer 2E made of anodic oxide film on its surface. Then first ends of lead wire 1A, 1B are connected to anode foil 2A, cathode foil 2B, respectively. Next, separator 2C is interposed between anode foil 2A and cathode foil 2B, and they are wound together into a cylindrical shape. Then the cylindrical shape is fixed with insulating tape 2D on the outer wall to form capacitor element 2.

Next, conductive polymer layer 6 is formed between anode foil 2A and cathode foil 2B of capacitor element 2. Conductive polymer layer 6 is formed as followings: First, fine particles of polyethylene dioxythiophene containing dopant agent are dispersed into solvent, i.e. water, to prepare dispersions-solution, and then capacitor element 2 is dipped into this dispersions-solution in a depressurized condition. Then capacitor element 2 is taken out and put into a drying oven at 125° C. to be dried.

Next, capacitor element 2 is impregnated with the electrolyte solution, and put in housing 3 made of aluminum, then sealing body 4 made of rubber packing is placed at the opening of housing 3. A drawing process is performed around the outer wall of housing 3 to form drawn section 3A, thereby sealing the opening with the aid of sealing body 4. Then a voltage is applied across lead wires 1A and 1B to provide chemical conversion again (aging), so that the hybrid electrolytic capacitor is completed.

As described above, conductive polymer layer 6 is formed in the following procedures: the dispersions-solution is prepared in advance outside capacitor element 2. In this solution, fine particles of the conductive polymer are dispersed. Then capacitor element 2 is impregnated with the dispersions solution, and then the solvent of the solution is removed. Therefore, conductive polymer layer 6 is not formed by chemical polymerization reaction within capacitor element 2. This reaction is caused by inputting polymerization materials such as monomer, oxidizer, and dopant into capacitor element 2. To be more specific, any oxidizer is not used in manufacturing capacitor elements 2. As a result, dielectric layer 2E encounters less damages comparing with conductive layer 6 formed by the chemical polymerization reaction. The foregoing method also allows forming flat conductive polymer layer at a higher density over the surfaces of anode foil 2A, cathode foil 2B and separator 2C. As a result, even if dielectric layer 2E is damaged by heat or other, the foregoing structure allows mitigating the degree of damage, and thus the electrolyte solution can recover dielectric layer 2E at a higher probability.

On top of that, this hybrid electrolytic capacitor does not need cleaning the oxidizer remaining after the chemical polymerization reaction within capacitor element 2, so that it can eliminate a drying process accompanying the cleaning process. As a result, a simpler manufacturing can be expected.

In this hybrid electrolytic capacitor, the fine particles of conductive polymer are filled at a ratio of 5-55 volume % relative to the void volume of capacitor element 2. Maintaining this amount of the fine particles filled-in improves anti-heat properties of solder of the electrolytic capacitor, thereby extending the service life of the capacitor.

However, the manufacturing method discussed above cannot help producing fine particles 6D of conductive polymer in polymer layer 6 as shown in FIG. 6. Particles 6D do not involve improving the movement of electric charges between the electrode foils. Conductive polymer layer 6 includes conductive polymer fine particles (hereinafter referred to simply as particles) 6A-6D. Particles 6A are attached to the surface of anode foil 2A, particles 6B are attached to the surface of cathode foil 2B, and particles 6C are attached to the fiber surface of separator 2C. However, particles 6D branch from those surfaces and project toward voids between anode foil 2A and cathode foil 2B.

The filled amount of the particles includes a lot of loss (an amount of particles 6D), so that the productivity of the electrolytic capacitors is lowered. In other words, it is difficult to reduce an amount of the conductive polymer, and to shorten the time necessary for impregnating capacitor element 2 with the dispersions-solution. The productivity thus cannot be improved further more.

Figure 1:
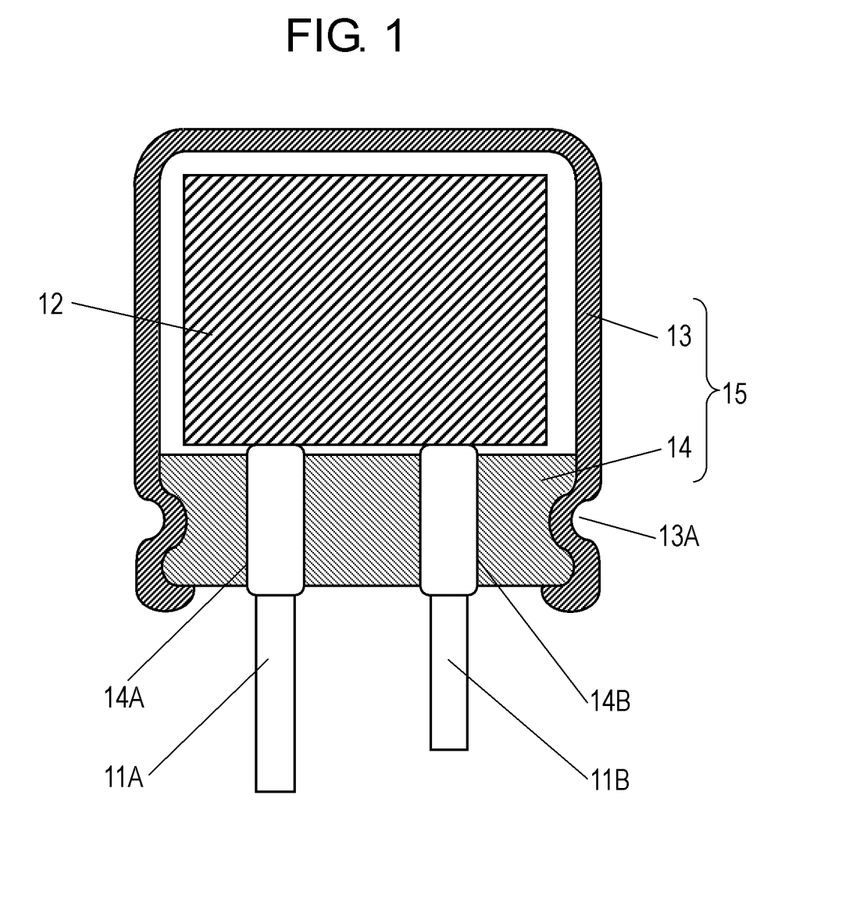
FIG. 1 is a sectional view of an example of an electrolytic capacitor in accordance with an embodiment of the present invention, and the sectional view shows a structure of a hybrid electrolytic capacitor including a wound-type capacitor element.
Figure 2:
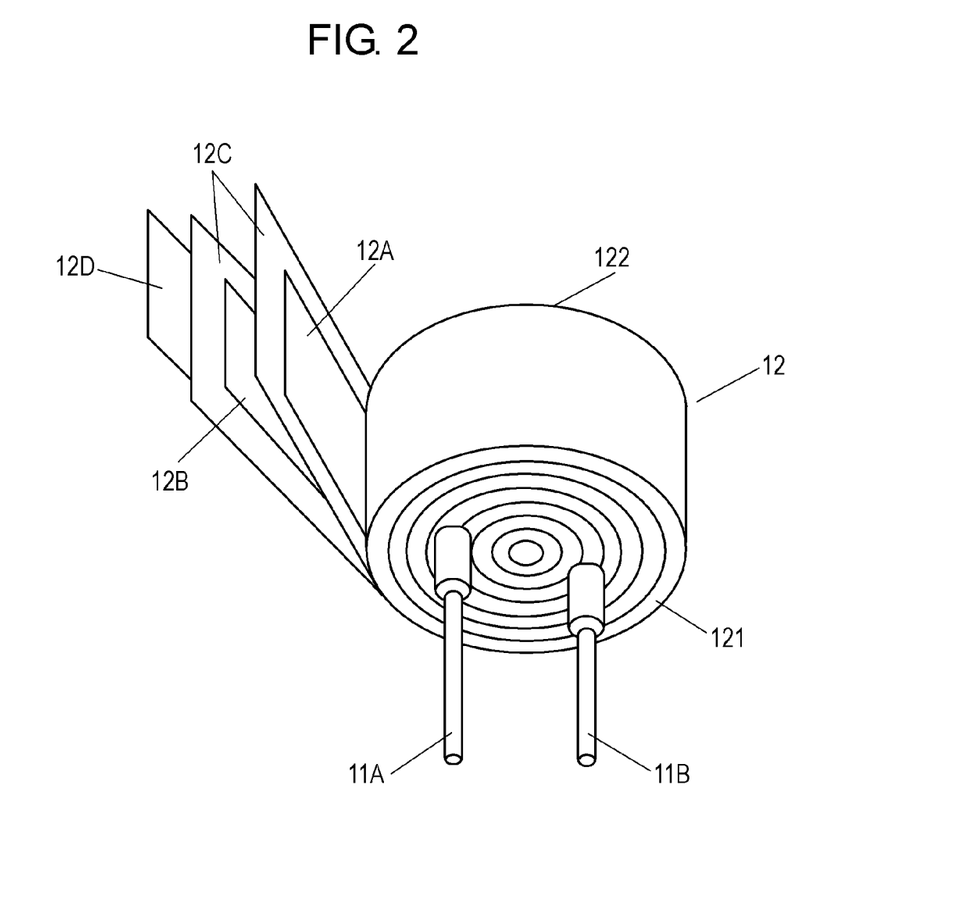
FIG. 2 is an exploded perspective view of the capacitor element shown in FIG. 1.
Figure 3:
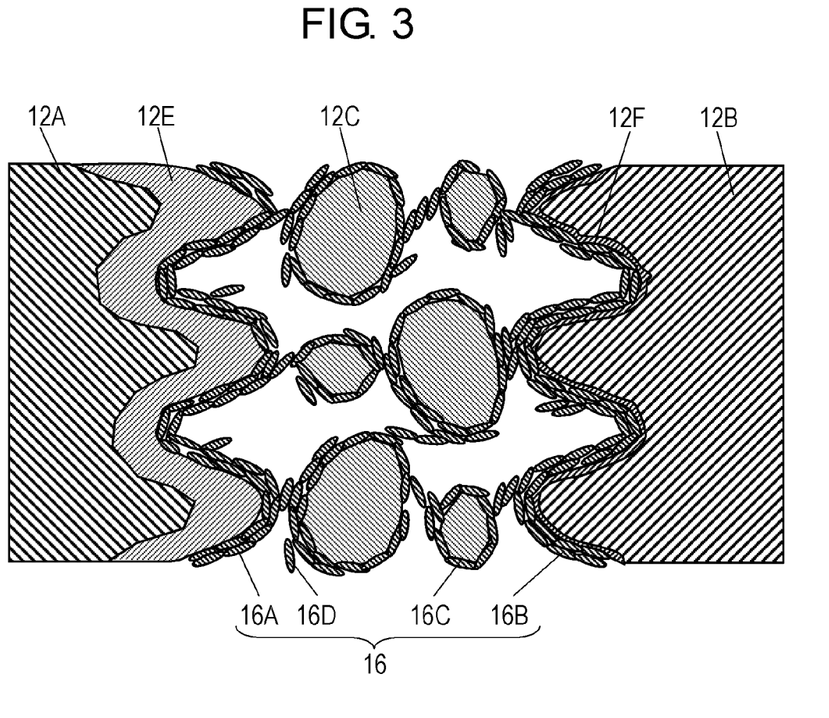
FIG. 3 is a sectional view enlarging schematically an essential part of the capacitor element shown in FIG. 1.

Hereinafter the electrolytic capacitor in accordance with the embodiment is demonstrated with reference to FIG. 1-FIG. 3. This capacitor addresses the problems discussed above. FIG. 1 is a sectional view of an example of the electrolytic capacitor in accordance with this embodiment of the present invention, and the sectional view shows a structure of a hybrid electrolytic capacitor including a wound-type capacitor element. FIG. 2 is an exploded perspective view of the capacitor element shown in FIG. 1. FIG. 3 is a sectional view enlarging schematically an essential part of the capacitor element shown in FIG. 1.

As shown in FIG. 1, the hybrid electrolytic capacitor in accordance with this embodiment has the following structural elements: capacitor element 12 working as a functional element; electrolyte solution (not shown) impregnated in capacitor element 12; and outer package 15 enclosing capacitor element 12 together with the electrolyte solution. Capacitor element 12 is connected with first ends of lead wires 11A, 11B as leader terminals. Second ends of lead wires 11A, 11B are led outside of outer package 15.

Outer package 15 is formed of housing 13 and sealing body 14. Cylindrical housing 13 having a bottom accommodates capacitor element 12 impregnated with the electrolyte solution. Sealing body 14 is provided with through-holes 14A, 14B for lead wires 11A, 11B to run through. Sealing body 14 is disposed at the opening of housing 13. An outer wall of housing 13 undergoes a drawing process to form drawn section 13A, where sealing body 14 is compressed to seal the opening. Sealing body 14 is formed of rubber material such as ethylene propylene rubber, isobutylene-isoprene rubber, or resin material such as epoxy resin.

As shown in FIG. 2 and FIG. 3, capacitor element 12 includes anode foil 12A, cathode foil 12B, and separator 12C. Anode foil 12A has dielectric layer 12E on its surface. Anode foil 12A is thus made by etching the foil formed of valve metal, e.g. aluminum, and roughening the surface of the foil, and then forming dielectric layer 12E of anodic oxide film on the surface through chemical conversion. Cathode foil 12B confronting anode foil 12A is also made of valve metal, e.g. aluminum. Separator 12C is interposed between anode foil 12A and cathode foil 12B.

As shown in FIG. 2, anode foil 12A and cathode foil 12B are wound together with separator 12C interposed therebetween, thereby forming capacitor element 12. First ends of lead wire 11A, 11B are connected to anode foil 12A and cathode foil 12B respectively. Both of second ends thereof are led out from first end face 121 of capacitor element 12. Capacitor element 12 has first end face 121 and second end face 122 opposite to first end face 121. Capacitor element 12 can be formed by layering multiple electrode foils instead of winding the electrode foils (anode foil 12A and cathode foil 12B).

As shown in FIG. 3, between anode foil 12A and cathode foil 12B of capacitor element 12, conductive polymer layer 16 is formed. Polymer layer 16 is made of aggregate of fine particles of conductive polymer, e.g. polythiophene or its derivative. Conductive polymer layer 16 is a solid electrolytic layer formed on the surfaces of anode foil 12A, cathode foil 12B, and separator 12C. Fine particles of the conductive polymer are dispersed into solvent, whereby the particles can be handled as a dispersions-solution.

Conductive polymer layer 16 includes conductive polymer fine particles (hereinafter referred to simply as particles) 16A-16C. Particles 16A are attached to the surface of anode foil 12A, particles 16B are attached to the surface of cathode foil 12B, and particles 16C are attached to the fiber surface of separator 12C. The sizes of particles 16A-16C fall within a range from 25 nm to 100 nm, inclusive.

The sizes of particles 16A-16C are measured by this method: A laser beam is applied to the dispersions-solution, in which those particles are dispersed in the solvent, based on the dynamic light scattering method, and then the scattered light is observed with a photon detector. The particle size refers to a median diameter, and it is expressed in general as "d50".

Conductive polymer layer 16 includes particles 16A, 16B, and 16C and those adjacent particles are brought into contact with each other, thereby forming paths for the electric charges to move between anode foil 12A and cathode foil 12B. Besides those particles, layer 16 includes conductive polymer fine particles (hereinafter referred to simply as particles) 16D that branch from the surfaces of anode foil 12A, cathode foil 12B, and the fiber surface of separator 12C and project toward voids between anode foil 12A and cathode foil 12B. Particles 16D are attached to each of the surfaces discussed above but they neither involve enlarging an effective area of anode foil 12A, nor relate to an improvement of the movement of the electric charges between the electrode foils.

Particles 16A-16D are made of polyaniline, polypyrrole, polythiophene, and/or their derivatives. Polyethylene dioxythiophene among others, which is a derivative of polythiophene, has a heat decomposition temperature at as high as 350° C. This property is preferable for an application that needs heat resistance in a high temperature environment. Polyethylene dioxytiophene polystylene sulfonic acid (PEDOT-PSS) is one of the preferable materials featuring high conductivity and high dielectric strength (high withstanding voltage), and PEDOT-PSS contains polystylene sulfonic acid as dopant.

The fine particles of the conductive polymer can be attached to each of the surfaces generally this way: the dispersions-solution in which the fine particles are dispersed in the solvent is prepared, and capacitor element 12 is impregnated with this dispersions-solution, allowing the solution to diffuse into voids inside capacitor element 12. When this method is used, an amount of the fine particles attached inside capacitor element 12 has some relation to the electric characteristics of the electrolytic capacitor.

To be more specific, here is a relation between the amount of particles 16A-16D attached inside and an electrostatic capacity of the electrolytic capacitor. The smaller amount of particles 16A-16D attached inside capacitor element 12 decreases the electrostatic capacity gradually. When the amount of the particles attached inside reaches smaller than 0.3 mg/cm$^2$, (this value is converted to weight per unit area of anode foil 12A), the electrostatic capacity lowers drastically. On the other hand, the greater amount of the particles attached inside increases the electrostatic capacity gradually. However, when the amount of the particles attached inside exceeds 1.2 mg/cm$^2$, (this value is converted to weight per unit area of anode foil 12A), the electrostatic capacity does not increase any longer. The electrostatic capacity in this context refers to an initial value measured after the aging process.

Here is another relation between the amount of particles attached inside and an ESR value of the electrolytic capacitor. The smaller amount of the particles attached inside increases the ESR value gradually, and when the amount of particles reaches smaller than 0.3 mg/cm$^2$, (this value is converted to weight per unit area of anode foil 12A), the ESR value increases drastically. On the other hand, the greater amount of particles attached inside lowers the ESR value gradually, and when the amount exceeds 1.2 mg/cm$^2$, (this value is converted to weight unit area of anode foil 12A), the ESR value does not lower any longer. The ESR value in this context refers to an initial value measured after the aging process.

The foregoing relations between the amount of particles 16A-16D attached inside capacitor element 12 and the electrical characteristics of the electrolytic capacitor determine that the amount of particles attached inside falls within a range from 0.3 mg/cm$^2$ to 0.6 mg/cm$^2$, inclusive. Those values are converted to weight per unit area of anode foil 12A. In other words, the lower limit of the amount is set at a critical value that does not cause a drastic change in the electrostatic capacity or the ESR value. The upper limit of the amount is set at a critical value at which the electrostatic capacity or the ESR value enters into a steady range. In other words, this critical values minimize the amount of particles 16D that neither involve enlarging the effective area of anode foil 12A nor relate to the improvement of the movement of electric charges between the electrode foils. The unit area of anode foil 12A in this context refers to a projected area of anode foil 12A, namely, the area per either one of the two sides of the same foil 12A.

Unexamined Japanese Patent Application Publication No. 2009-16770 discloses the amount of particles 16A-16D attached inside, namely, it is expressed as a filling factor relative to a volume of voids in the capacitor element, and the amount falls within the range from 0.96-3.85 volume %, where the volume of voids is 48 μl, and area of anode foil 12A is 2 cm$^2$, a specific gravity of particles 16A-16D is 1.3.

Separator 12C is brought into contact not only with solid conductive polymer working as electrolyte but also with electrolyte solution, so that separator 12C needs to have solvent resistant properties. For instance, chemical fiber based material employs aramid, and cellulose based material employs manila or esparto. To be more specific, separator 12C can employ non-woven fabric containing cellulose, craft, polyethylene terephthalate, polybutylene terephthalate, polyphenylene sulfide, nylon, aromatic polyamide, polyimide, polyamideimide, polyetherimide, rayon, or glassy material. Please note that the sizes of particles 16A-16D are not greater than 100 nm. In the case, a uniform dispersion of particles 16A-16D inside capacitor element 12, and stable attachment of the particles onto the surfaces of anode foil 12A, cathode foil 12B, and fiber surface of separator 12C need an air-tightness of separator 12C to fall within a range from 0.5 s/100 ml to 2.0 s/100 ml, inclusive. Use of this separator 12C having the foregoing air-tightness allows isolating anode foil 12A from cathode foil 12B so as not to touch each other, and also allows diffusing uniformly the conductive polymer fine particles dispersed in the dispersions-solution into the voids between the fibers of separator 12C.

The air-tightness of separator 12C is a value measured according to the method specified in JIS P 8117 (method of testing the air permeability and air resistance of paper and paper board). This value is obtained this way: a cylinder throttle plate measuring 6 mm in diameter is mounted to B-type measuring instrument at its lower part where test piece is supposed to be mounted, and a separator paper which is raw fabric of separator 12C is put onto a throttle face. A time (s/100 ml) necessary for the air of 100 ml to pass through a cylindrical face, which measures 6 mm in diameter, of the separator paper is measured.

The separator containing fibril fiber can be thinned with ease; however, it becomes denser and thus tends to have a greater air-tightness. This material is not preferable because it prevents the conductive polymer fine particles from diffusing uniformly in the dispersions-solution. It is preferable to employ a separator formed of fibers not containing the fibers of which diameters are not greater than 0.1 μm and lengths are not greater than 10 μm. It is more preferable to employ a separator formed of only long fibers of which diameters fall within the range from 1 μm to 50 μm, and having an aspect ratio within the range from 100 to 50000.

The electrolyte solution is prepared by solving a solute in a solvent. The material for the solvent can be γ-butyrolactone, ethylene glycol, or sulfolane. In the case of hybrid electrolytic capacitor, a value of the inter-electrode resistance between anode foil 12A and cathode foil 12B largely depends on the conductivity of conductive polymer layer 16, and little depends on the conductivity of the electrolyte solution. The electrolytic capacitor generally employs solely the electrolyte solution as electrolyte, and this capacitor cannot employ a large amount of polyethylene glycol as solvent; however, as discussed above, the electrolytic capacitor of the present invention can employ the polyethylene glycol. The solute includes, e.g. ammonium salt of inorganic acid, amine salt of inorganic acid, alkyl substitution amidine salt of inorganic acid or their quaternized products, ammonium salt of organic acid, amine salt of organic acid, alkyl substitution amidine salt of organic acid or their quaternized products.

The electrolyte solution can contain appropriate additives for absorbing gas, stabilizing dielectric strength, adjusting pH, and preventing oxidation. For instance, as oxidation preventive agent, amine-based oxidation preventive agent, benzotriazole-based oxidation preventive agent, phenol-based oxidation preventive agent, phosphorous-based oxidation preventive agent are effective for capacitors. To be more specific, diphenylamine, naphthol, nitrophenol, catechol, resorcinol, hydroquinone, and pyrogallol can be used. Hydroquinone and pyrogallol among others have multiple OH groups, so that they can produce strong oxidation preventive effect.

Next, a method of manufacturing the electrolytic capacitors in accordance with the embodiment is demonstrated hereinafter. First, as shown in FIGS. 2 and 3, anode foil 12A having dielectric layer 12E on its surfaces, cathode foil 12B, and separator 12C are cut at a given length and a given width. Then first ends of lead wires 11A, 11B are connected to anode foil 12A, cathode foil 12B respectively by crimping or using ultrasonic wave. Thereafter, separator 12C is interposed between anode foil 12A and cathode foil 12B, and they are wound together into a cylindrical shape. Then the cylindrical shape is fixed at its outer wall with insulating tape 12D to form a precursor of a capacitor element. This precursor looks like capacitor element 12 shown in FIG. 2.

The surface of anode foil 12A has undergone an etching process or an evaporation of metal particles, so that the surface area is increased. Dielectric layer 12E is obtained as an anodic oxide film by providing valve metal such as aluminum as electrode material with anodic oxidation. Alternatively, dielectric layer 12E can be formed by evaporation or application onto the metal foil of anode foil 12A.

The surface of cathode foil 12B undergoes, when necessary, the surface treatment such as etching, oxide film forming, evaporation of metal particles, or attachment of conductive particles of, e.g. carbon.

Thereafter, the precursor of capacitor element may be dipped into a chemical conversion solution, and a voltage may be applied to lead wires 11A, 11B, thereby recovering and chemically converting the oxide film on the surface of anode foil 12A.

Next, as shown in FIG. 1, lead wires 11A, 11B led out from the precursor are inserted into through-holes 14A, 14B provided to sealing body 14, and then, sealing body 14 is mounted to the precursor. Sealing body 14 can be mounted to the precursor before dipping it in the chemical conversion solution.

Then as shown in FIG. 3, conductive polymer layer 16 is formed between anode foil 12A and cathode foil 12B of the precursor of capacitor element. First, the dispersions-solution in which the fine particles of conductive polymer are dispersed in the solvent is prepared. The precursor of capacitor element is impregnated with this dispersions-solution so that the dispersions-solution can permeate through the inside of the precursor.

As a method for impregnating the capacitor element 12 with the dispersions-solution, it is preferable to place the precursor of capacitor element horizontally with its second end face 122 facing upward, then drop the dispersions-solution onto second end-face 122. This method prevents variation in the amount of dispersions-solution impregnated into the precursor, so that a stable amount of particles 16A-16D attached inside the precursor can be maintained.

In addition, the air pressure around the precursor impregnated with the dispersions-solution can be decompressed, and then the pressure can be restored to the atmospheric pressure. This change in air pressure will promote the permeation of the dispersions-solution through the precursor.

Next, the precursor impregnated with the dispersions-solution is heated to reduce the amount of solvent, so that particles 16A-16D aggregate and they attach like a film to the surfaces of anode foil 12A and cathode foil 12B, and the fiber surface of separator 12C. Capacitor element 12 is thus formed. In this case, the dispersions-solution is so prepared that the amount of particles 16A-16D attached should fall within the range from 0.3 mg/cm$^2$ to 1.2 mg/cm$^2$, inclusive, where these values are converted into weight per unit area of anode foil 12A. To be more specific, the concentration of the dispersions-solution is adjusted.

To increase the productivity, it is preferable to attach a given amount of conductive polymer fine particles in one-time impregnation process. To achieve this one-time impregnation, the fine particles can be dispersed in the solvent at a concentration falling within the range from 1.25 wt % to 2.8 wt %, inclusive, and the particle sizes should fall within the range from 25 nm to 100 nm, inclusive.

Next, capacitor element 12 is accommodated into housing 13 together with the electrolyte solution, and sealing body 14 is placed at the opening of housing 13. For impregnating capacitor element 12 with the electrolyte solution, a given amount of the electrolyte solution is put in housing 13 in advance, thereafter, while capacitor element 12 is accommodated in housing 13, the electrolyte solution impregnates into capacitor element 12. Alternatively, capacitor element 12 can be dipped into a bath storing the electrolyte solution, and then taken out from the bath before it is accommodated in housing 13. If necessary, a degree of vacuum around the bath can be adjusted. An electrolyte solution surplus to the impregnation can be held in housing 13.

Next, a drawing process is provided around the outer wall of housing 13 to form drawn section 13A, thereby sealing the opening with the aid of sealing body 4. Alternatively, as outer package 15, insulating resin such as epoxy resin for the package can employed to cover capacitor element 12, and the second ends of lead wires 11A, 11B can be led outside this package.

Meanwhile, an insulating plate (not shown) provided with a pair of through-holes can be placed adjacently to the opening of housing 13. In this case, the second ends of lead wires 11A, 11B led out from the outer face of sealing body 14, which seals the opening of housing 13, are inserted into the through-holes of the insulating plate. Then lead wires 11A, 11B are bent oppositely to each other at approx. right angles to be accommodated in grooves (not shown) provided to the outer surface of the insulating plate. A surface-mount type electrolytic capacitor may be thus completed.

After sealing the opening of housing 13 or after mounting the insulating plate to the opening, a voltage can be applied appropriately between lead wires 11A and 11B to carry out the chemical conversion again.

As discussed above, the electrolytic capacitor in accordance with this embodiment has the following specifications: an air-tightness of separator 12C falls within the range from 0.5 s/100 ml to 2.0 s/100 ml, inclusive, sizes of particles 16A-16D fall within the range from 25 nm to 100 nm, inclusive, a content of particles 16A-16D falls within the range from 0.3 mg/cm$^2$ to 1.2 mg/cm$^2$, inclusive, as converted into weight per unit area of anode foil 12A. In this capacitor, particles 16A-16C are attached to the surfaces of anode foil 12A, cathode foil 12B, and the fiber surface of separator 12C. Particles 16C attached to the fiber surface of separator 12C work as the paths for the electric charges to move between the surface of anode foil 12A and the surface of cathode foil 12B. The foregoing specifications can minimize the amount of particles 16D attached inside capacitor element 12. Particles 16D branch toward the voids inside capacitor element 12, e.g. between fibers of separator 12C. This minimization allows reducing a loss amount of conductive polymer. As a result, the foregoing specifications achieve the electrolytic capacitor of smaller in size, greater in capacity, lower ESR, smaller leakage current, and greater dielectric strength (withstanding voltage).

Particles 16A-16C maintain their spherical shape with the aid of electrostatic repulsion while they are dispersed in the solvent of the dispersions-solution. However, when the amount of solvent is decreased, the electrostatic repulsion becomes weaker, so that the spherical shape changes into flat shape. In the case of forming a film by aggregating the fine particles of conductive polymer, an excessively great size of the fine particles thus adversely affects the orientation of the fine particles, and this excessively great size becomes a factor of preventing the film formation.

To avoid the foregoing problem, the sizes of particles 16A-16C are regulated to be not greater than 100 nm. This specification allows the fine particles of conductive polymer to aggregate and to attach to the surface of anode foil 12A, cathode foil 12B, and the fiber surface of separator 12C as a flat film. This specification can also inhibit the production of particles 16D that branch from the surfaces of anode foil 12A, cathode foil 12B, and the fiber surface of separator 12C and project toward voids between anode foil 12A and cathode foil 12B.

Meanwhile, fine etching pits exist on the surface of anode foil 12A. The etching pit generally measures 100-200 nm in diameter. It is thus preferable that particles 16A enters into the etching pits in order to form the film formed of aggregated particles 16A uniformly and flat on the surface of anode foil 12A. Since the size of particles 16A is regulated to be not greater than 100 nm, particles 16A can enter into the etching pits, so that the electrostatic capacity can be increased and the ESR can be lowered.

The electrolytic capacitor sometimes needs heat resistance to reflow-soldering of 200° C. or higher, or needs a long-term heat resistance in a high temperature environment where the maximum operating temperature exceeds 105° C. In such a case, thermal stress produces oxidation-degradation or heat shrinkage in the film formed of the aggregated fine particles of conductive polymer which forms polymer layer 16. In the hybrid electrolytic capacitor, the electrolyte solution covers the surface of conductive polymer layer 16, so that this structure can mitigate the thermal stress. However, a too small amount of particles 16A-16D attached cannot allow the electrolyte solution to mitigate the thermal stress, and results in lowering the electric characteristics of the electrolytic capacitor. On top of that, when the electrolyte solution decreases in its amount, the electric characteristics remarkably lower. It is thus preferable to determine the lower limit of the amount of particles 16A-16D attached in order to improve not only the initial characteristics but also the reliability of the heat resistance to the reflow-soldering and the reliability of the long-term heat resistance. To be more specific, the content of the particles is preferably not smaller than 0.4 mg/cm$^2$ per unit area of anode foil 12A. This specification allows the particles in polymer layer 16 to resist against the thermal stress, and maintains steadily the electric characteristics of the electrolytic capacitor.

The method of manufacturing the electrolytic capacitor in accordance with the embodiment of the present invention employs the dispersions-solution in which the fine particles of conductive polymer are dispersed in the solvent, and thus attaches the fine particles onto the surface of anode foil 12A and the like. In this method, a condition for the precursor of the capacitor element is determined that separator 12C should have the air-tightness falling within the range from 0.5 s/100 ml to 2.0 s/100 ml, inclusive, and a condition for the dispersions-solution is determined that the sizes of the particles fall within the range from 25 nm to 100 nm, inclusive, and the particle concentration should be not greater than 2.8 wt %. Those conditions allow the fine particles of conductive polymer to diffuse uniformly in the precursor of the capacitor element.

After preparing the foregoing conditions, as the solvent of the dispersions-solution is decreased, the fine particles aggregate and form a uniform and flat film as conductive polymer layer 16 on the surfaces of anode foil 12A cathode foil 12B, and the fiber surface of separator 12C. Then the impregnating conditions such as the amount of dispersions-solution to be impregnated into the precursor and how many times the impregnation processes should be determined. Those preparations allow the amount of the attached fine particles to fall within the range from 0.3 mg/cm$^2$ to 1.2 mg/cm$^2$, inclusive, as converted into weight per unit area of anode foil 12A. As a result, these preparations can minimize the loss amount of the fine particles to be attached, namely, the amount of fine particles, which branch and project toward the voids inside capacitor element 12 and do not involve the movement of the electric charges, can be minimized. As a result, a minimum amount of attached particles can be ensured for stabilizing the initial electric characteristics of the electrolytic capacitor.

It is preferable to determine that the amount of the attached fine particles should fall within the range from 0.4 mg/cm$^2$ to 1.2 mg/cm$^2$, inclusive. This specification allows obtaining sufficiently the fine particles, resisting to the thermal stress at a high temperature, of the conductive polymer in conductive polymer layer 16. As a result, the electric characteristics of the electrolytic capacitor can be maintained steadily.

A concentration higher than 2.8 wt % of the fine particles of conductive polymer in the dispersions-solution will prevent the uniform diffusion of the fine particles into the precursor of the capacitor element. During the film formation while the solvent is decreased, the film thus becomes uneven, which results in degradation of the electric characteristics.

A concentration lower than 1.2 wt % of the fine particles in the dispersions-solution will not allow the one-time impregnation to attach the fine particles to the surfaces in an amount greater than 0.3 mg/cm$^2$ per unit area of anode foil 12A even if the maximum volume of the dispersions-solution is input into the precursor of the capacitor element.

It is thus preferable to employ the dispersions-solution of which concentration of the fine particles of conductive polymer falls within the range from 1.2 wt % to 2.8 wt %, inclusive. Use of such solution and one-time operation of a series of processes of impregnating into capacitor element 12 and removing the solvent allow the fine particles of conductive polymer to attach to the surfaces of anode foil 12A, cathode foil 12B, and the fiber surface of separator 12C. The amount of the fine particles attached falls within the range from 0.3 mg/cm$^2$ to 0.67 mg/cm$^2$, inclusive, as converted to weight per unit area of anode foil 12A. As a result, capacitor element 12 can be sealed together with the electrolyte solution in outer package 15, whereby the electrolytic capacitor having excellent electric characteristics can be manufactured efficiently.

A lower limit of the concentration of the conductive polymer fine particles can be determined at 1.67 wt %, and then a lower limit of the amount of the attached fine particles can be regulated in an amount not smaller than 0.4 mg/cm$^2$ as converted into weight per unit area of anode foil 12A. As a result, conductive polymer layer 16 resisting to the thermal stress at a high temperature can be formed, so that the electrolytic capacitor of extremely reliable in the heat resistance to the reflow soldering and in the long-term heat resistance can be manufactured.

When the solvent of the dispersions-solution contains polar organic medium, the flatness of the film, formed of the fine particles of conductive polymer and covering the surfaces of anode foil 12A, cathode foil 12B, and the fiber of separator 12C, can be improved. The better flatness of the film will increase the electric conductivity of the film per se, and reduce the loss amount of attached particles that do not involve the movement of electric charges. These attached particles branch from the electrode foil surfaces and the fiber surface of the separator and project toward the voids. The polar organic medium specifically refers to ethylene glycol.

Since the ethylene glycol is widely used as a chief solvent of the electrolyte solution of electrolytic capacitors, use of this agent is preferable because it affects little the quality of electrolytic capacitors.

However, too much amount of the polar organic medium will increase the viscosity of the dispersions-solution, so that degree of the impregnation into the capacitor element is lowered. To the contrary, too little amount of the polar organic medium will not produce the advantage discussed above. Thus, a content of the polar organic medium preferably ranges from 1 wt % to 50 wt %, inclusive.

The structure discussed above uses lead-wires 11A and 11B to form terminals that connect capacitor element 12 to the outside; however, the present invention is not limited to this structure. For instance, the present invention is applicable to a tables structure. In the tables structure, an anode foil and a cathode foil expose their ends, and then the foils are wound together to form a capacitor element, so that the anode foil and the cathode foil are exposed from an upper and a lower end of the capacitor element. Those exposed sections are electrically connected to a terminal plate disposed at a sealing body and to an inner bottom of the housing, respectively.

The advantages of the embodiment are described hereinafter with specific experiments.

Sample E1

Sample E1 of the electrolytic capacitor in accordance with the embodiment is prepared as follows: Sample E1 is a hybrid electrolytic capacitor and includes a wound-type capacitor element. The specification is followings: rated voltage is 35V, initial electrostatic capacity is 33 µF (tolerance ±20%), diameter is 6.3 mm, height is 5.8 mm, guaranteed service life under high temperature load is 5000 hours at 105° C.

First, as shown in FIG. 2, dielectric layer 12E is formed on the surface of anode foil 12A made of aluminum foil, where dielectric layer 12E is made of aluminum oxide layer. Then anode foil 12A, cathode foil 12B, and separator 12C are cut at a given width and length. First ends of lead wires 11A, 11B are connected to anode foil 12A and cathode foil 12B respectively by a needle crimping method. Then separator 12C is interposed between anode foil 12A and cathode foil 12C, and they are wound together into a cylindrical shape. An outer wall of the cylindrical shape is fixed with insulating tape 12D, whereby the precursor of capacitor element is formed.

The foregoing procedure is detailed hereinafter. Anode foil 12A employs aluminum foil of which purity is not lower than 99.99%, and this aluminum foil undergoes an etching process to enlarge the surface area, and then undergoes an anodic oxidation process (chemical conversion voltage at 60V) for forming dielectric layer 12E made of anodic oxidation film as shown in FIG. 3. Then anode foil 12A is cut into rectangular shape such that the rectangular piece has a projected area of 2.0 cm$^2$.

Cathode foil 12B made of aluminum foil, of which purity is not lower than 99.99%, is employed and this aluminum foil undergoes an etching process to enlarge the surface area, and then undergoes an anodic oxidation process (chemical conversion voltage at 2V) for forming aluminum oxide layer 12F thinner than layer 12E as shown in FIG. 3. Then cathode foil 12B is cut into rectangular shape such that the rectangular piece has a given projected area confronting anode foil 12A.

Separator 12C employs mixed paper (material A) of manila and esparto. This mixed paper has a thickness of 50 µm, density of 0.35 g/cm$^2$, and air-tightness of 2.0 s/100 ml. This material A is cut into a size having a given area that can prevent the contact between anode foil 12A and cathode foil 12B, whereby separator 12C can be prepared. Material A is formed of long fibers that include no fine fiber having undergone a fibril process.

Next, lead wires 11A, 11B led out from the precursor of the capacitor element are penetrated through-holes 14A, 14B provided to sealing body 14 made of rubber packing respectively, and sealing body 4 is mounted to the precursor.

Then a failure at dielectric layer 12E of anode foil 12A is recovered, and then the precursor is dipped into chemical conversion solution for the precursor to undergo the chemical conversion process in order to form dielectric layer 12E on anode foil 12A at places vacant of layer 12E. To be more specific, a voltage of 60V is applied to lead wires 11A, 11B for 10 minutes, and the precursor of capacitor element is dried at 105° C. for 30 minutes.

Next, as shown in FIG. 3, conductive polymer layer 16 is formed between anode foil 12A and cathode foil 12B of the precursor. First, prepared is the dispersions-solution in which fine particles of the conductive polymer have been dispersed in a solvent which is made of mixed solvent of water and ethylene glycol. The weight of ethylene glycol (EG) should be not greater than 50 wt % of the total weight of the dispersions-solution.

The fine particles of conductive polymer employ PEDOT-PSS, and the particle size measures 50 nm in diameter. The particle density (concentration) in the dispersions-solution is adjusted at 2.0 wt %. Then an amount of the dopant is adjusted such that the electric conductivity of the fine particles can be measured 200 S/cm, which can be measured this way: the dispersions-solution is dropped on a flat plate to form a sheet-like film before the measurement.

Then the precursor of capacitor element is impregnated with the dispersions-solution in an amount of 28.8 μl so that the solution can permeate the precursor entirely. Before the impregnation, the precursor is placed horizontally such that second end-face 122 faces upward, and then the dispersions-solution is dropped onto second end-face 122.

Next, the air pressure around the precursor impregnated with the dispersions-solution is decompressed down to 60 mmHg (7999.2 PA) or lower, and thereafter, the pressure is restored to the atmospheric pressure, i.e. 760 mmHg (101325 PA), thereby producing a pressure change for the dispersions-solution to permeate the precursor more deeply.

Then the precursor impregnated with the dispersions—solution is heated at 100-150° C. for approx. 60 minutes to reduce the solvent. This heating process allows the fine particles of conductive polymer to aggregate and attach like a film onto the surfaces of anode foil 12A, cathode foil 12B, and the fiber surface of separator 12C. As a result, the volume of the attached fine particles amounts to 0.3 mg/cm$^2$ as converted to weight per unit area of anode foil 12A. Capacitor element 12 is thus formed.

On the other hand, the electrolyte solution is prepared, and put into housing 13 made of aluminum and having a bottom. An amount of the electrolyte solution to be input is determined considering the following relations: a relation between a design life and a speed at which the solution permeates and diffuses to outside through sealing body 14, and a relation between a volume of voids (vacant space) inside housing 13 and a volume expansion of the electrolyte solution in a high-temperature environment during the reflow soldering.

The electrolyte solution contains ethyl-dimethyl amine phthalate as the solution, γ-butyrolactone, sulfolane as the solvent, and polyethylene glycol (having a molecular weight of 300). Since the polyethylene glycol is hard to volatile, the electrolyte solution does not volatile completely but remains after a long-term use of the electrolytic capacitor under high-temperature operation, e.g. 85-150° C. The electrolyte solution thus can maintain the recovering properties from failures at the dielectric oxide film (dielectric layer 12E).

Next, capacitor element 12 is inserted into housing 13 to impregnate capacitor element 12 with the electrolyte solution, and sealing body 14 mounted to capacitor element 12 is placed at the opening of housing 13. An outer wall of housing 13 around the opening is drawn to form drawn section 13A, so that sealing body 14 made of elastic rubber can generate compression stress for sealing the opening of housing 13.

Then a voltage of 40 V is applied between lead wires 11A and 11B for 60 minutes to provide a chemical conversion again. Sample E1 of the electrolytic capacitor is thus completed.

Samples E2-E4 and samples C1, C2 have different amounts of the conductive polymer fine particles attached per unit area of anode foil 12A from that of sample E1. Samples E5, E6 and C3, C4 have different average sizes of the fine particles from that of sample E2. Samples E7-E11 and C5, C6 have different concentrations of the fine particles in the dispersions-solution and different amounts of the impregnated dispersions-solution from those of sample E2. Sample E12 employs different solvent in the dispersions-solution from that of sample E2. Sample E13, C7-C9 employ a different air-tightness of separator 12C from that of sample E2. Sample C10 employs no electrolyte solution relative to the structure of sample E4. The foregoing samples E2-E13 and C1-C10 are detailed hereinafter.

Sample E2

In sample E2, an amount of the disperses-solution to be used when conductive polymer layer 16 is formed inside the precursor of capacitor element is changed from that of sample E1, namely, the amount is increased to 38.4 μl. As a result, the fine particles of conductive polymer attached inside the precursor amount to 0.4 mg/cm$^2$ as converted to weight per unit area of anode foil 12A. The other structures remain the same as those of sample E1, and the hybrid electrolytic capacitor having a rated voltage of 35V and an initial electrostatic capacity of 33 μF is prepared.

Sample E3

In sample E3, an amount of the disperses-solution to be used when conductive polymer layer 16 is formed inside the precursor of capacitor element is changed from that of sample E1, namely, the amount is increased to 76.6 μl. Since the volume of voids in the precursor is 48 μl, the series operation of impregnation process and the heating process is repeated twice, and as a result, the fine particles of conductive polymer attached inside the precursor amount to 0.8 mg/cm$^2$ as converted to weight per unit area of anode foil 12A. The other structures remain the same as those of sample E1, and the hybrid electrolytic capacitor having a rated voltage of 35V and an initial electrostatic capacity of 33 μF is prepared.

Sample E4

In sample E4, an amount of the disperses-solution to be used when conductive polymer layer 16 is formed inside the precursor of capacitor element is changed from that of sample E1, namely, the amount is increased to 115.0 μl. Since the volume of voids in the precursor is 48 μl, the series operation of impregnation process and the heating process is repeated three times, and as a result, the fine particles of conductive polymer attached inside the precursor amount to 1.2 mg/cm$^2$ as converted to weight per unit area of anode foil 12A). The other structures remain the same as those of sample E1, and the hybrid electrolytic capacitor having a rated voltage of 35V and an initial electrostatic capacity of 33 μF is prepared.

Sample C1

In sample C1, an amount of the disperses-solution to be used when conductive polymer layer 16 is formed inside the precursor of capacitor element is changed from that of sample E1, namely, the amount is decreased to 19.1 μl. As a result, the fine particles of conductive polymer attached inside the precursor amount to 1.6 mg/cm$^2$ as converted to weight per unit area of anode foil 12A. The other structures remain the same as those of sample E1, and the hybrid electrolytic capacitor having a rated voltage of 35V and an initial electrostatic capacity of 33 μF is prepared.

Sample C2

In sample C2, an amount of the disperses-solution to be used when conductive polymer layer 16 is formed inside the precursor of capacitor element is changed from that of sample E1, namely, the amount is increased to 153.0 μl. Since the volume of voids in the precursor is 48 μl, the series operation of impregnation process and the heating process is repeated four times, and as a result, the fine particles of conductive polymer attached inside the precursor amount to 1.6 mg/cm$^2$ as converted to weight per unit area of anode foil 12A. The other structures remain the same as those of sample E1, and the hybrid electrolytic capacitor having a rated voltage of 35V and an initial electrostatic capacity of 33 μF is prepared.

Sample E5

In sample E5, an average particle size of the fine particles of conductive polymer dispersed in the dispersions-solution is changed from that of sample E2. This dispersions-solution is used when conductive polymer layer 16 is formed inside the precursor of capacitor element of sample E5. The average particle size of sample E5 measures 25 nm in diameter. The other structures remain the same as those of sample E2, and the hybrid electrolytic capacitor having a rated voltage of 35V and an initial electrostatic capacity of 33 μF is prepared.

Sample E6

In sample E6, an average particle size of the fine particles of conductive polymer dispersed in the dispersions-solution is changed from that of sample E2. This dispersions-solution is used when conductive polymer layer 16 is formed inside the precursor of capacitor element of sample E6. The average particle size of sample E6 measures 100 nm in diameter. The other structures remain the same as those of sample E2, and the hybrid electrolytic capacitor having a rated voltage of 35V and an initial electrostatic capacity of 33 μF is prepared.

Sample C3

In sample C3, an average particle size of the fine particles of conductive polymer dispersed in the dispersions-solution is changed from that of sample E2. This dispersions-solution is used when conductive polymer layer 16 is formed inside the precursor of capacitor element of sample C3. The average particle size of sample C3 measures 150 nm in diameter. The other structures remain the same as those of sample E2, and the hybrid electrolytic capacitor having a rated voltage of 35V and an initial electrostatic capacity of 33 μF is prepared.

Sample C4

In sample C4, an average particle size of the fine particles of conductive polymer dispersed in the dispersions-solution is changed from that of sample E2. This solution is used when conductive polymer layer 16 is formed inside the precursor of capacitor element. The average particle size of sample C4 is changed to 10 nm. The other structures remain the same as those of sample E2, and the hybrid electrolytic capacitor having a rated voltage of 35V and an initial electrostatic capacity of 33 μF is prepared.

Sample E7

In sample E7, a concentration of the fine particles in dispersions—solution is changed from that of sample E2. This solution is used when conductive polymer layer 16 is formed inside the precursor of capacitor element. The concentration of sample E7 is changed to 1.25 wt %. An amount of the dispersions-solution is also changed, namely, one-time impregnation can fill all the voids of the precursor with the solution of 48 μl. As a result, the fine particles of conductive polymer attach to the inside of precursor in an amount of 0.3 mg/cm$^2$ as converted to weight per unit area of anode foil 12A. The other structures remain the same as those of sample E2, and the hybrid electrolytic capacitor having a rated voltage of 35V and an initial electrostatic capacity of 33 μF is prepared.

Sample E8

In sample E8, a concentration of the fine particles in dispersions—solution is changed from that of sample E2. This solution is used when conductive polymer layer 16 is formed inside the precursor of capacitor element. The concentration of sample E8 is changed to 1.67 wt %. An amount of the dispersions-solution is also changed, namely, one-time impregnation can fill all the voids of the precursor with the solution of 48 μl. As a result, the fine particles of conductive polymer attach to the inside of precursor in an amount of 0.4 mg/cm$^2$ as converted to weight per unit area of anode foil 12A. The other structures remain the same as those of sample E2, and the hybrid electrolytic capacitor having a rated voltage of 35V and an initial electrostatic capacity of 33 μF is prepared.

Sample E9

In sample E9, a concentration of the fine particles in dispersions—solution remains unchanged from that of sample E2. This solution is used when conductive polymer layer 16 is formed inside the precursor of capacitor element. Namely the concentration of sample E9 is thus maintained at 2.0 wt %. An amount of the dispersions-solution is changed, namely, one-time impregnation can fill all the voids of the precursor with the solution of 48 μl. As a result, the fine particles of conductive polymer attach to the inside of precursor in an amount of 0.48 mg/cm$^2$ as converted to weight per unit area of anode foil 12A. The other structures remain the same as those of sample E2, and the hybrid electrolytic capacitor having a rated voltage of 35V and an initial electrostatic capacity of 33 μF is prepared.

Sample E10

In sample E10, a concentration of the fine particles in dispersions—solution is changed from that of sample E2. This solution is used when conductive polymer layer 16 is formed inside the precursor of capacitor element. Namely the concentration of sample E10 is changed to 2.5 wt %. An amount of the dispersions-solution is also changed, namely, one-time impregnation can fill all the voids of the precursor with the solution of 48 μl. As a result, the fine particles of conductive polymer attach to the inside of precursor in an amount of 0.6 mg/cm$^2$ as converted to an amount per unit area of anode foil 12A. The other structures remain the same as those of sample E2, and the hybrid electrolytic capacitor having a rated voltage of 35V and an initial electrostatic capacity of 33 μF is prepared.

Sample E11

In sample E11, a concentration of the fine particles in dispersions—solution is changed from that of sample E2. This solution is used when conductive polymer layer 16 is formed inside the precursor of capacitor element. The concentration of sample E11 is changed to 2.8 wt %. An amount of the dispersions-solution is also changed, namely, one-time impregnation can fill all the voids of the precursor with the solution of 48 μl. As a result, the fine particles of conductive polymer attach to the inside of precursor in an amount of 0.67 mg/cm$^2$ as converted to an amount per unit area of anode foil 12A. The other structures remain the same as those of sample E2, and the hybrid electrolytic capacitor having a rated voltage of 35V and an initial electrostatic capacity of 33 μF is prepared.

Sample C5

A concentration of the fine particles dispersing in dispersions-solution used in sample C5 is changed from that of sample E2. This solution is used when conductive polymer layer 16 is formed inside the precursor of capacitor element. The concentration of sample C5 is changed to 0.83 wt %. An amount of the dispersions-solution is also changed, namely, one-time impregnation can fill all the voids of the precursor with the solution of 48 μl. As a result, the fine particles of conductive polymer attach to the inside of precursor in an amount of 0.2 mg/cm$^2$ as converted to an amount per unit area of anode foil 12A. The other structures remain the same as those of sample E2, and the hybrid electrolytic capacitor having a rated voltage of 35V and an initial electrostatic capacity of 33 μF is prepared.

Sample C6

A concentration of the fine particles in dispersions-solution used in sample C6 is changed from that of sample E2. This solution is used when conductive polymer layer 16 is formed inside the precursor of capacitor element. The concentration of sample C6 is changed to 3.3 wt %. An amount of the dispersions-solution is also changed, namely, one-time impregnation can fill all the voids of the precursor with the solution of 48 μl. As a result, the fine particles of conductive polymer attach to the inside of precursor in an amount of 0.8 mg/cm² as converted to an amount per unit area of anode foil 12A. The other structures remain the same as those of sample E2, and the hybrid electrolytic capacitor having a rated voltage of 35V and an initial electrostatic capacity of 33 μF is prepared.

Sample E12

The solvent of dispersions-solution of sample E12 is changed from that of sample E2, namely, sample E12 uses only water as the solvent. This dispersions-solution is used when conductive polymer layer 16 is formed inside the precursor of capacitor element. The other structures remain the same as those of sample E2, and the hybrid electrolytic capacitor having a rated voltage of 35V and an initial electrostatic capacity of 33 μF is prepared.

Sample C7

Separator 12C of sample C7 is changed from that of sample E2, namely it is made of mixed paper (material B) of hemp and special rayon, and has a thickness of 50 μm, density of 0.35 g/cm², and air-tightness of 6.2 s/100 ml. Material B contains fine fibers having undergone the fibril process. The other structures remain the same as those of sample E2, and the hybrid electrolytic capacitor having a rated voltage of 35V and an initial electrostatic capacity of 33 μF is prepared.

Sample C8

Separator 12C of sample C8 is changed from that of sample E2, namely, separator 12C employs mixed paper (material C), which is formed this way: an amount of the fine fibers having undergone the fibril process in material B is adjusted such that material C has an air-tightness of 3.0 s/100 ml. The other structures remain the same as those of sample E2, and the hybrid electrolytic capacitor having a rated voltage of 35V and an initial electrostatic capacity of 33 μF is prepared.

Sample E13

Separator 12C of sample E13 employs mixed paper made of material D different from material A used in sample E2. Material D is formed this way: an amount of long fibers in material A is adjusted to have an air-tightness of 0.5 s/100 ml, thereby forming material D. The other structures remain the same as those of sample E2, and the hybrid electrolytic capacitor having a rated voltage of 35V and an initial electrostatic capacity of 33 μF is prepared.

Sample C9

Separator 12C of sample C9 employs mixed paper made of material E different from material A used in sample E2. Material E is formed this way: an amount of long fibers in material A is adjusted to have an air-tightness of 0.1 s/100 ml, thereby forming material E. The other structures remain the same as those of sample E2, and the hybrid electrolytic capacitor having a rated voltage of 35V and an initial electrostatic capacity of 33 μF is prepared.

Sample C10

Sample C10 does not use the electrolyte solution comparing with the structure of sample E4. The other structures remain the same as those of sample E4, and a completely solid electrolytic capacitor having a rated voltage of 35V and an initial electrostatic capacity of 33 μF is prepared.

Table 1 lists the structures of samples E1-E13 and samples C1-C10.

TABLE 1

| | fine particles of conductive polymer | | dispersions-solution | | | | separator | | Availability of |
|---|---|---|---|---|---|---|---|---|---|
| | Attached amount (mg/cm²) | Diam. (nm) | concentration (wt %) | Impregnated amount (μl) | solvent | Numbers of processes | Material | Air-tightness (s/100 ml) | Electrolyte solution |
| C1 | 0.20 | 50 | 2.00 | 19.1 | W + E | 1 | A | 2.0 | Av |
| E1 | 0.30 | 50 | 2.00 | 28.8 | W + E | 1 | A | 2.0 | Av |
| E2 | 0.40 | 50 | 2.00 | 38.4 | W + E | 1 | A | 2.0 | Av |
| E3 | 0.80 | 50 | 2.00 | 76.6 | W + E | 2 | A | 2.0 | Av |
| E4 | 1.20 | 50 | 2.00 | 115.0 | W + E | 3 | A | 2.0 | Av |
| C2 | 1.60 | 50 | 2.00 | 153.0 | W + E | 4 | A | 2.0 | Av |
| E5 | 0.40 | 25 | 2.00 | 38.4 | W + E | 1 | A | 2.0 | Av |
| E6 | 0.40 | 100 | 2.00 | 38.4 | W + E | 1 | A | 2.0 | Av |
| C3 | 0.40 | 150 | 2.00 | 38.4 | W + E | 1 | A | 2.0 | Av |
| C4 | 0.40 | 10 | 2.00 | 38.4 | W + E | 1 | A | 2.0 | Av |
| C5 | 0.20 | 50 | 0.83 | 48.0 | W + E | 1 | A | 2.0 | Av |
| E7 | 0.30 | 50 | 1.25 | 48.0 | W + E | 1 | A | 2.0 | Av |
| E8 | 0.40 | 50 | 1.67 | 48.0 | W + E | 1 | A | 2.0 | Av |
| E9 | 0.48 | 50 | 2.00 | 48.0 | W + E | 1 | A | 2.0 | Av |
| E10 | 0.60 | 50 | 2.50 | 48.0 | W + E | 1 | A | 2.0 | Av |
| E11 | 0.67 | 50 | 2.80 | 48.0 | W + E | 1 | A | 2.0 | Av |
| C6 | 0.80 | 50 | 3.30 | 48.0 | W + E | 1 | A | 2.0 | Av |
| E12 | 0.40 | 50 | 2.00 | 38.4 | W | 1 | A | 2.0 | Av |
| C7 | 0.40 | 50 | 2.00 | 38.4 | W + E | 1 | B | 6.2 | Av |
| C8 | 0.40 | 50 | 2.00 | 38.4 | W + E | 1 | C | 3.0 | Av |
| E13 | 0.40 | 50 | 2.00 | 38.4 | W + E | 1 | D | 0.5 | Av |
| C9 | 0.40 | 50 | 2.00 | 38.4 | W + E | 1 | E | 0.1 | Av |
| C10 | 1.20 | 50 | 2.00 | 115.0 | W + E | 1 | A | 2.0 | N/A |

W: water, E: ethylene glycol

Samples E1-E13 and samples C1-C10 are prepared in a quantity of 30 respectively, and the initial electric characteristics of those samples are measured and listed in Table 2. The initial electric characteristics refer to measuring an electrostatic capacity with 120 Hz and at 20° C. and an ESR value with 100 kHz at 20° C. of each sample, and averages thereof are listed in Table 2.

Samples E1-E6 undergoes a reflow-soldering heat resistant test and a high temperature load test. The electric characteristics after these tests are measured and listed in table 2. The reflow-soldering heat resistant test is done in the following conditions: peak temperature is 255° C., and the test is done at 250° C. or higher for 10 seconds or shorter, at 230° C. or higher for 30 seconds or shorter, at 217° C. or higher for 40 seconds or shorter, and a preheat is done at 160° C. or higher for 120 seconds or shorter. The reflow is done twice. As the high temperature load test, a rated voltage is applied to the samples at 105° C. for 5000 hours.

After the reflow-soldering heat resistant test or the high temperature load test, an electrostatic capacity and an ESR value are measured under the foregoing conditions as the electric characteristics, and the averages thereof are listed in Table 2. A rate of change from the initial characteristics is calculated and listed in Table 2.

To be more specific, the following conditions should be satisfied for the fine particles of conductive polymer to attach onto the surfaces of anode foil 12A, cathode foil 12B, and the fiber surface of separator 12C, thereby forming paths for the electric charges to move between anode foil 12A and cathode foil 12B:

air-tightness of separator 12C≤2.0 s/100 ml;

a contained amount of fine particles of conductive polymer falls within the range from 0.3 mg/cm$^2$ to 1.2 mg/cm$^2$, inclusive, as converted to amounts per unit area of anode foil 12A; and a particle size is not greater than 100 nm in diameter.

The foregoing conditions also allows minimizing the amount of the fine particles branching toward the voids between the fibers of separator 12C, namely, the fine particles in this state do not involve improving the movement of electric charges, so that the foregoing conditions can minimize the loss amount of conductive polymer.

The hybrid electrolytic capacitors of sample E1-E4 have the fine particles of conductive polymer attached inside in an amount of 0.4 mg/cm$^2$ or greater as converted to an amount per unit area of anode foil 12A. Therefore, even if the capacitors are left in a high temperature environment, e.g. the maximum operating temperature over 105° C. for a long time or

TABLE 2

| | Initial value | | After reflow resistant test | | | | After high temperature load test | | | |
|---|---|---|---|---|---|---|---|---|---|---|
| | Electrostatic capacity (μF) | ESR (mΩ) | Electrostatic capacity (μF) | Rate of change (%) | ESR (mΩ) | Rate of change (%) | Electrostatic capacity (μF) | Rate of change (%) | ESR (mΩ) | Rate of change (%) |
| C1 | 27.5 | 46.7 | — | — | — | — | — | — | — | — |
| E1 | 28.7 | 28.3 | 26.8 | −6.6 | 45.8 | 162.0 | 19.5 | −32.1 | 64.5 | 228.0 |
| E2 | 29.9 | 27.6 | 29.0 | −2.9 | 36.2 | 131.0 | 26.4 | −11.8 | 39.5 | 143.0 |
| E3 | 30.1 | 27.4 | 29.4 | −2.2 | 31.5 | 115.0 | 27.2 | −9.5 | 36.7 | 134.0 |
| E4 | 30.5 | 26.8 | 30.0 | −1.7 | 29.2 | 109.0 | 28.1 | −7.9 | 32.4 | 121.0 |
| C2 | 30.4 | 26.9 | — | — | — | — | — | — | — | — |
| E5 | 32.1 | 27.7 | 31.2 | −2.8 | 37.1 | 134.0 | 28.3 | −11.9 | 39.3 | 142.0 |
| E6 | 28.2 | 35.5 | 27.3 | −3.1 | 47.9 | 135.0 | 24.4 | −13.5 | 51.8 | 146.0 |
| C3 | 18.2 | 68.8 | | | | | | | | |
| C4 | 32.0 | 45.5 | | | | | | | | |
| C5 | 28.1 | 48.2 | | | | | | | | |
| E7 | 29.3 | 28.4 | | | | | | | | |
| E8 | 29.9 | 27.8 | | | | | | | | |
| E9 | 30.5 | 26.5 | | | | | | | | |
| E10 | 29.6 | 26.2 | | | | | | | | |
| E11 | 29.1 | 26.2 | | | | | | | | |
| C6 | 29.0 | 47.0 | | | | | | | | |
| E12 | 29.3 | 35.3 | | | | | | | | |
| C7 | 30.2 | 45.1 | | | | | | | | |
| C8 | 30.1 | 43.5 | | | | | | | | |
| E13 | 29.9 | 28.4 | | | | | | | | |
| C9 | Short | Short | | | | | | | | |
| C10 | 21.1 | 82.5 | | | | | | | | |

As Table 1 shows, the hybrid electrolytic capacitors represented by samples E1-E4 have the fine particles of conductive polymer attached inside and the amount thereof falls within the range from 0.3 mg/cm$^2$ to 1.2 mg/cm$^2$, inclusive, as converted to amounts per unit area of anode foil 12A. The initial ESR value is thus lowered and stabilized.

As the data of sample C1 shows, when the amount of fine particles attached inside is smaller than 0.3 mg/cm$^2$ as converted to an amount per unit area of anode foil 12A, a drastically high initial ESR value is expected. The data of sample C2 shows, when the amount of fine particles attached inside exceeds 1.2 mg/cm$^2$, its advantage of lowering the ESR cannot be expected any longer, and a loss amount, which does not involve improving the movement of electrical charges, is increased.

undergo the reflow soldering process over 200° C., and thus the capacitors receive thermal stress due to the environment, the foregoing amount of fine particles allows mitigating thermal stress and stabilizing the electric characteristics.

As the test results of samples E5 and E6 show, when an average size of the fine particles of conductive polymer is 100 nm or smaller, a high electrostatic capacity and a low ESR value can be obtained stably.

On the other hand, as the test result of sample C3 shows, an average particle size greater than 100 nm will decrease the electrostatic capacity and increase the ESR value, so that the electric characteristics are degraded drastically.

As the test result of sample C4 shows, an average fine-particle size smaller than 25 nm invites a greater contact resistance between the fine particles of conductive polymer, so that the ESR value increases. As a result, the average fine-particle size of conductive polymer smaller than 25 nm degrades drastically the electric characteristics.

As the test results of sample E2 and E13 show, when an air-tightness of separator 12C is 2.0 s/100 ml or smaller, the dispersions-solution containing the fine particles of which sizes are 100 nm or smaller can permeate wound-type capacitor element 12 and diffuse therein uniformly. As a result, the fine particles of conductive polymer can attach inside the entire capacitor element, such as, to the fiber surface of separator 12C, the surfaces of anode foil 12A and cathode foil 12B. Therefore, the electrostatic capacity can be increased and the ESR value can be lowered.

As the test results of sample C7 and C8 show, when an air-tightness of separator 12C exceeds 2.0 s/100 ml, the permeability of the dispersions-solution into capacitor element 12 is lowered, so that the uniformity of the attached fine particles onto the fiber surface in separator 12C is lowered. As a result, the electrostatic capacity is decreased and the ESR value is increased.

As the test result of sample C9 shows, the air-tightness of separator 12C smaller than 0.5 s/100 ml prevents separator 12C from fully avoiding the contact between anode foil 12A and cathode foil 12B, so that defects caused by short increase.

The test result of sample C10 shows remarkably lower electric characteristics than that of sample E4. This tells that even if the amount of fine particles attached to a unit area of anode foil 12A reaches the upper limit, i.e. 1.2 g/cm$^2$, the capacitor like sample C7 that does not employ the electrolyte solution cannot achieve a greater electrostatic capacity nor a lower ESR value achieved by the capacitor employing the electrolyte solution.

As the test results of samples E7-E11 show, when the concentration of the fine particles of conductive polymer in the dispersions-solution is adjusted within the range from 1.25 wt % to 2.8 wt %, inclusive, a series of operations, i.e. impregnation into the precursor of capacitor element and removing the solvent, can be done only one time. This one-time operation allows the fine particles of conductive polymer to attach to the surfaces of anode foil 12A, cathode foil 12B, and the fiber surface of separator 12C in an amount falling within the range from 0.3 mg/cm$^2$ to 0.67 mg/cm$^2$, inclusive, as converted weight per unit area of anode foil 12A. As a result, capacitor element 12 and the electrolyte solution are enclosed in outer package 15, thereby producing efficiently the electrolytic capacitor of excellent electric characteristics.

When a lower limit of the concentration of the fine particles of conductive polymer in the dispersions-solution is set at 1.67 wt %, a lower limit of the amount of the fine particles attached inside can be regulated not smaller than 0.4 mg/cm$^2$ per unit area of anode foil 12A. As a result, a sufficient amount of the fine particles of conductive polymer is obtained, so that conductive polymer layer 16 resisting to thermal stress at a high temperature can be formed. The electrolytic capacitor having higher reliabilities of heat-resistance against reflow soldering and of long term heat-resistance can be produced.

On the other hand, as the test result of sample C5 shows, when the concentration of the fine particles of conductive polymer in the dispersions-solution is lower than 1.25 wt %, even if a maximum amount of the dispersions-solution impregnable is input in the precursor of capacitor element, the one-time operation can only attach the fine particles in a maximum amount smaller than 0.3 mg/cm$^2$ to a unit area of anode foil 12A.

As the test result of sample C6 shows, when a concentration of the fine particles of conductive polymer in the dispersions-solution exceeds 2.8 wt %, it is hard that the fine particles dispersed in the dispersions-solution can diffuse uniformly inside capacitor element 12. Therefore, during the film formation from the fine particles through reducing the solvent of dispersions-solution, the film thus becomes uneven, and as a result, excellent electric characteristics cannot be obtained.

As the test results of samples E2 and E12 show, when the solvent of the dispersions-solution contains polar organic medium besides water, e.g. ethylene glycol, the film made of the fine particles of conductive polymer and covering the surfaces of anode foil 12A, cathode foil 12B and the fiber surface of separator 12C increases its flatness. As a result, the electrical conductivity of filmed conductive polymer layer 16 is increased. On top of that, the amount of fine particles 16D can be reduced, where particles 16D branch from the surfaces of anode foil 12A, cathode foil 12B and the fiber surface of separator 12C and project toward the voids, namely, particles 16D do not involve the movement of electric charges.

The foregoing electrolytic capacitor of the present invention is small in size, great in capacity, and has a low ESR, low leakage current, and high withstanding voltage. On top of that, this capacity has a better productivity. The electrolytic capacity is thus useful for a smoothing circuit on a power-supply side and a control circuit of audio-video devices and automotive electronics which need a long-term high reliability.

What is claimed is:

1. A method of manufacturing an electrolytic capacitor, the method comprising:
   preparing a capacitor element precursor including an anode member having a dielectric layer, a cathode member, and a separator interposed between the anode member and the cathode member;
   impregnating the capacitor element precursor with a dispersion including fine particles of conductive polymer and a solvent;
   producing a capacitor element having a solid electrolytic layer made of the fine particles of the conductive polymer by removing at least a part of the solvent in the dispersion with which the capacitor element precursor is impregnated,
   wherein the separator has an air-tightness of 2.0 s/100 ml or less, and
   sizes of the fine particles of the conductive polymer in the dispersion are 100 nm or less.

2. The method of manufacturing an electrolytic capacitor according to claim 1,
   wherein the concentration of the fine particles of the conductive polymer in the dispersion is within a range from 1.25 wt % to 2.8 wt %, inclusive.

3. The method of manufacturing an electrolytic capacitor according to claim 1,
   wherein the capacitor element precursor is impregnated with the dispersion such that the capacitor element includes the fine particles of the conductive polymer in an amount falling within a range from 0.3 mg/cm$^2$ to 1.2 mg/cm$^2$, inclusive, as converted to weight per unit area of the anode member.

4. The method of manufacturing an electrolytic capacitor according to claim 1,
   wherein the separator is substantially free from a fibrillated fiber.

5. The method of manufacturing an electrolytic capacitor according to claim 1, wherein the separator is substantially free from a fine fiber having a diameter of 0.1 μm or less and a length of 10 μm or less.

6. The method of manufacturing an electrolytic capacitor according to claim 1,
wherein the solvent of the dispersion contains water and polar organic medium.

7. The method of manufacturing an electrolytic capacitor according to claim 6,
wherein the polar organic medium is ethylene glycol.

8. The method of manufacturing an electrolytic capacitor according to claim 1, further comprising:
impregnating the capacitor element with an electrolyte solution after producing the capacitor element.

9. The method of manufacturing an electrolytic capacitor according to claim 1,
wherein the capacitor element precursor is formed by winding the anode member and the cathode member together with the separator therebetween, leader terminals being connected to the anode member and the cathode member, respectively,
wherein the capacitor element precursor has a first end-face from which both of the leader terminals are led out, and a second end-face opposite to the first end face, and
wherein when the capacitor element precursor is impregnated with the dispersion, the capacitor element precursor is placed such that the first end-face is downward while the second end-face is upward, and the dispersion is dropped onto the second end-face.

10. A method of manufacturing an electrolytic capacitor, the method comprising:
forming a capacitor element precursor by winding an anode member and a cathode member together with a separator interposed therebetween, leader terminals being connected to the anode member and the cathode member, respectively;
impregnating the capacitor element precursor with a liquid component,
wherein the capacitor element precursor has a first end-face from which both of the leader terminals are led out, and a second end-face opposite to the first end face, and
wherein when the capacitor element precursor is impregnated with the liquid component, the capacitor element precursor is placed such that the first end-face is downward while the second end-face is upward, and the liquid component is dropped onto the second end-face.

* * * * *